US009478040B2

(12) United States Patent
Jumpasut et al.

(10) Patent No.: US 9,478,040 B2
(45) Date of Patent: Oct. 25, 2016

(54) METHOD AND APPARATUS FOR SEGMENTING OBJECT IN IMAGE

(71) Applicant: Samsung Electronics Co., Ltd., Gyeonggi-do (KR)

(72) Inventors: Arin Jumpasut, Seoul (KR); Seong-oh Lee, Gyeonggi-do (KR); Moon-sik Jeong, Gyeonggi-do (KR); Sung-do Choi, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 14/469,406

(22) Filed: Aug. 26, 2014

(65) Prior Publication Data

US 2015/0063697 A1  Mar. 5, 2015

(30) Foreign Application Priority Data

Aug. 27, 2013 (KR) .......................... 10-2013-0101999

(51) Int. Cl.
*G06K 9/34* (2006.01)
*G06T 7/00* (2006.01)

(52) U.S. Cl.
CPC ... *G06T 7/0093* (2013.01); *G06T 2207/20072* (2013.01); *G06T 2207/20092* (2013.01); *G06T 2207/20101* (2013.01); *G06T 2207/20112* (2013.01); *G06T 2207/20144* (2013.01)

(58) Field of Classification Search
USPC ........... 382/173, 171, 154; 345/419; 348/42, 348/384.1, 699, 700; 358/1.9; 375/E7.081, 375/240.08; 378/8, 15, 62
See application file for complete search history.

(56) References Cited

U.S. PATENT DOCUMENTS

| 6,349,113 | B1 * | 2/2002 | Mech | G06T 7/2053 348/699 |
| 6,975,755 | B1 * | 12/2005 | Baumberg | G06K 9/4642 345/419 |
| 7,660,463 | B2 | 2/2010 | Blake et al. | |
| 7,660,473 | B2 | 2/2010 | Gormish | |
| 8,238,660 | B2 | 8/2012 | Lin et al. | |

(Continued)

FOREIGN PATENT DOCUMENTS

| EP | 1 626 371 | 2/2006 |
| WO | WO 2008/052226 | 5/2008 |
| WO | WO 2013/144418 | 10/2013 |

OTHER PUBLICATIONS

"GrabCut"—Interactive Foreground Extraction using Iterated Graph Cuts, Rother, C., Kolmogorov, V., Blake, A. (Microsoft Corporation).

(Continued)

*Primary Examiner* — Anh Do
(74) *Attorney, Agent, or Firm* — The Farrell Law Firm, P.C.

(57) ABSTRACT

A method and apparatus are provided for segmenting an object in an image. The method includes obtaining a first image including the object; receiving an input signal including information about a predetermined position in the first image; selecting at least one pixel included in the first image, based on the position information; generating a second image by dividing the first image into several areas, using the selected at least one pixel; and segmenting the object in the first image by using the first image and the second image.

19 Claims, 10 Drawing Sheets

(56) References Cited

U.S. PATENT DOCUMENTS

| | | |
|---|---|---|
| 8,386,964 B2 | 2/2013 | Sun et al. |
| 9,167,172 B2 * | 10/2015 | Takaiwa ............... H04N 5/2354 |
| 2006/0039611 A1 | 2/2006 | Rother et al. |
| 2008/0136820 A1 | 6/2008 | Yang et al. |
| 2011/0216976 A1 | 9/2011 | Rother et al. |
| 2011/0274352 A1 | 11/2011 | Blake et al. |
| 2013/0205248 A1 | 8/2013 | Moon et al. |

OTHER PUBLICATIONS

Geodesic Star Convexity for Interactive Image Segmentation, Gulshan, V., Rother C., Criminisi, A., Blake, A., Zisserman, A. (University of Oxford/Microsoft Corporation).

Olga Veksler et al., "Star Shape Prior for Graph-Cut Image Segmentation", Computer Vision—ECCV 2008, Oct. 12, 2008.

European Search Report dated Feb. 5, 2015 issued in counterpart application No. 14182426.8-1906.

* cited by examiner

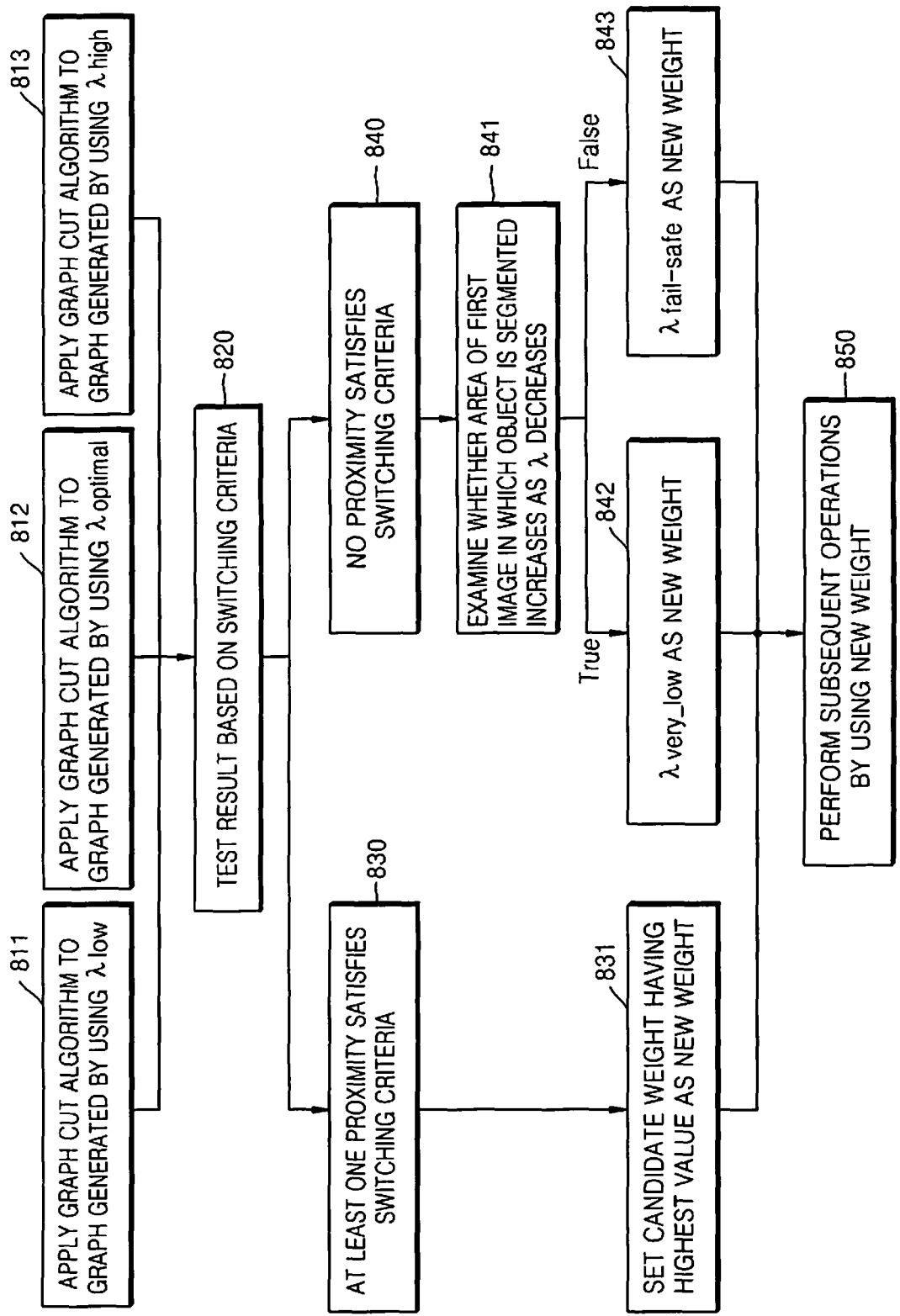

METHOD AND APPARATUS FOR SEGMENTING OBJECT IN IMAGE

PRIORITY

This application claims priority under 35 U.S.C. §119(a) to Korean Patent Application No. 10-2013-0101999, which was filed in the Korean Intellectual Property Office on Aug. 27, 2013, the entire disclosure of which is incorporated herein by reference.

BACKGROUND

1. Field of the Invention

The present invention relates generally to methods and apparatuses for segmenting an object in an image, and more particularly, to methods and apparatuses for accurately segmenting an object in an input image through repeated interaction with a user or by repeatedly applying an algorithm.

2. Description of the Related Art

Image segmentation refers to dividing an input image into areas having homogeneous properties, where the divided areas should not overlap one another. Image segmentation is performed as a preprocess in various fields, such as object tracking and recognition, computer vision, image processing, image retrieval, face detection and recognition, etc.

An automatic object segmentation technique has recently been applied to terminals such as mobile phones, tablet Personal Computers (PCs), smart TeleVisions (TVs), etc. While areas having similar textures or colors are detected and segmented using a conventional object segmentation technique, a newer object segmentation technique performs segmentation of an object of interest, which is set in advance. However, due to diverse characteristics of an object of interest such as color, shape, motion, or texture, it is often difficult to accurately segment an object of interest in an image.

SUMMARY

The present invention has been designed to address at least the aforementioned limitations and above problems and/or disadvantages in the conventional art and to provide at least the advantages described below.

Accordingly, an aspect of the present invention is to provide a method and apparatus for segmenting an object in an image.

Additional aspects will be set forth in part in the description which follows and, in part, will be apparent from the description, or may be learned by practice of the presented embodiments.

In accordance with an aspect of the present invention, a method is provided for segmenting an object in an image. The method includes obtaining a first image including the object; receiving an input signal including information about a predetermined position in the first image; selecting at least one pixel included in the first image, based on the position information; generating a second image by dividing the first image into several areas, using the selected at least one pixel; and segmenting the object in the first image by using the first image and the second image.

In accordance with another aspect of the present invention, a non-transitory computer readable recording medium is provided having embodied thereon a program for executing the steps of obtaining a first image including the object; receiving an input signal including information about a predetermined position in the first image; selecting at least one pixel included in the first image, based on the position information; generating, by using the selected at least one pixel, a second image that is obtained by dividing the first image into several areas, using the selected at least one pixel; and segmenting the object in the first image by using the first image and the second image.

In accordance with another aspect of the present invention, an apparatus is provided for segmenting an object in an image. The apparatus includes an interface unit for obtaining a first image including an object and receiving an input signal including information about a predetermined position in the first image; an image generating unit for selecting at least one pixel included in the first image, based on the information about the predetermined position, and generating a second image by dividing the first image into several areas using the selected at least one pixel; and a segmentation unit for segmenting the object in the first image by using the first image and the second image.

BRIEF DESCRIPTION OF THE DRAWINGS

The above and other aspects, features, and advantages of certain embodiments of the present invention will be more apparent from the following detailed description when taken in conjunction with the accompanying drawings, in which:

FIG. 8 is a flowchart illustrating an operation for optimizing a weight λ according to an embodiment of the present invention.

DETAILED DESCRIPTION OF EMBODIMENTS OF THE PRESENT INVENTION

Figure 1:
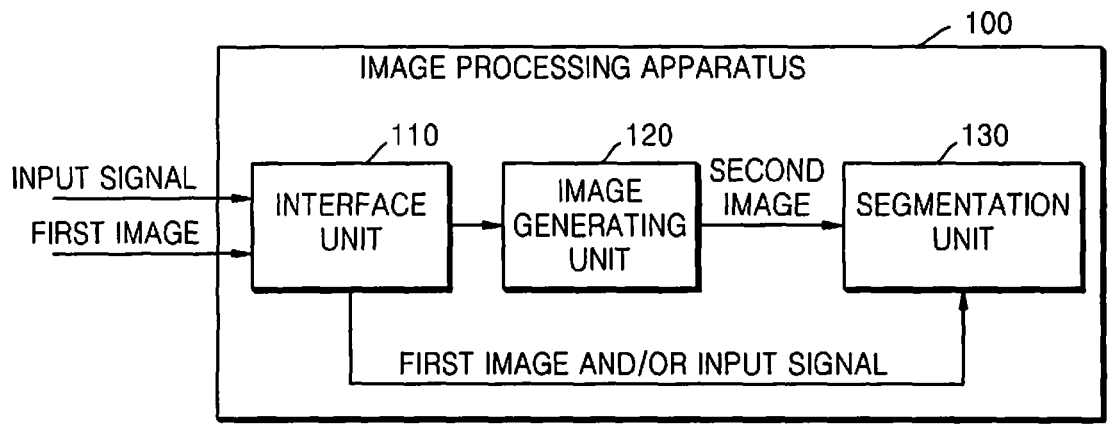
FIG. 1 illustrates an image processing apparatus according to an embodiment of the present invention.

Various embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

Further, expressions such as "at least one of," when preceding a list of elements, modify the entire list of elements and do not modify the individual elements of the list.

The following embodiments of the present invention are to specify the present invention but do not limit or define the scope of the present invention. Details that are easily derivable by one of ordinary skill in the art to which the present invention pertains based on the detailed description of the invention and embodiments of the present invention are construed as being in the scope of the present invention.

FIG. 1 illustrates an image processing apparatus according to an embodiment of the present invention.

Referring to FIG. 1, the image processing apparatus 100 includes an interface unit 110, an image generating unit 120, and a segmentation unit 130. The image processing apparatus 100 illustrated in FIG. 1 includes only components related to the present embodiment. Thus, it will be obvious to one of ordinary skill in the art that other general-use components may be further included in addition to the components illustrated in FIG. 1.

Also, the interface unit 110, the image generating unit 120, and the segmentation unit 130 of the image processing apparatus 100 illustrated in FIG. 1 may be realized as a single processor or multiple processors. A processor may be formed of an array including a plurality of logic gates or of a combination of a general-use microprocessor and a memory in which programs that are executable on the microprocessor are stored. Also, it will be obvious to one of ordinary skill in the art that a processor may also be realized as another hardware type processor.

The interface unit 110 receives a first image including an object and also receives an input signal including information about a predetermined position in the first image.

The input signal is input by a user at a predetermined position on a terminal screen by using a body part, an electronic pen, etc. For example, a user may draw a closed loop or a straight line on the terminal screen via a finger gesture or touch a predetermined point on the terminal screen. However, the gesture is not limited thereto.

Also, the first image is formed of a foreground image including an object, and a background image.

Hereinafter, it will be assumed that one object is included in the first image, but the embodiments of the present invention described herein are not limited thereto. That is, when the first image includes a plurality of objects, the plurality of objects may also be sequentially or simultaneously segmented in the first image in accordance with the embodiments of the present invention.

The first image may refer to a color image indicated by color values of a plurality of pixels (for example, RGB colors) included in a terminal screen, but is not limited thereto. For example, the first image may refer to a grayscale image or a plane background image.

The interface unit 110 may function both as a communication interface unit through which the first image is obtained from an external device and a user interface unit through which the input signal of the user is received. For example, the communication interface unit may include all of a network module and a Universal Serial Bus (USB) host module. The user interface unit may also include different input and output devices such as a display panel, a mouse, a keyboard, a touch screen, a monitor, or a speaker, and a software module for driving these components.

The image generating unit 120 selects at least one of pixels included in the first image, based on the information about the predetermined position in the first image, and generates a second image by using the selected at least one pixel.

The second image is obtained by dividing the first image into several areas. For example, the image generating unit 120 divides the first image into different areas, based on position information received from the interface unit 110, and generates the second image using the image divided into the areas. The areas include a foreground area (hereinafter referred to as a first area), a possible foreground area (hereinafter referred to as a second area), a background area (hereinafter referred to as a third area), a possible background area (hereinafter referred to as a fourth area), and an area that is unknown as to whether it is a foreground area or a background area (hereinafter referred to as a fifth area).

FIGS. 2A through 2H illustrate an operation of generating a second image according to an embodiment of the present invention.

Referring to FIGS. 2A through 2H, an image on the left side is a first image, and an image on the right side is a second image.

Figure 2A:
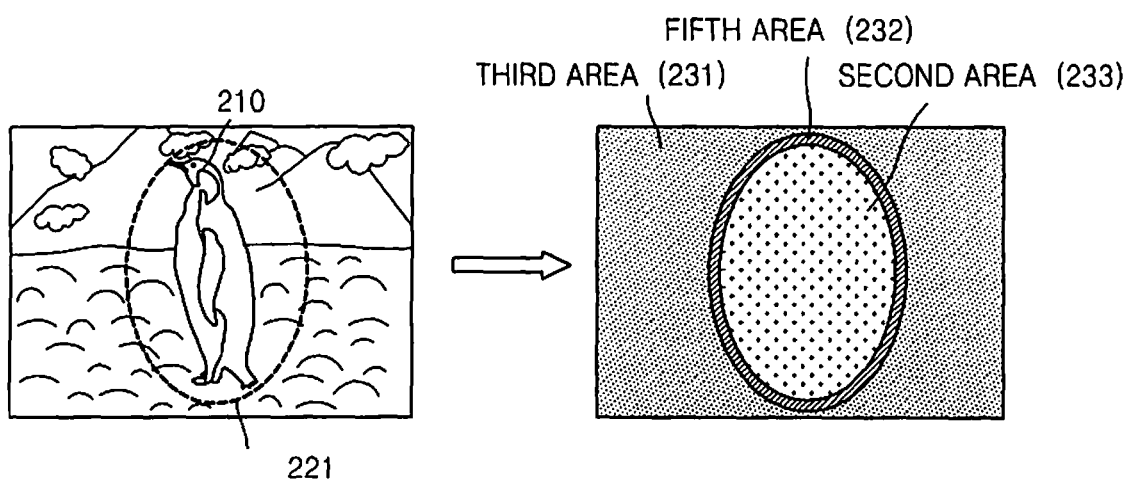
FIGS. 2A through 2H illustrate an operation of generating a second image according to an embodiment of the present invention.

Specifically, FIG. 2A illustrates an operation of generating the second image, e.g., by the image generating unit 120 as illustrated in FIG. 1, when a user inputs a signal as a closed loop 221 on a terminal screen.

Referring to the first image of FIG. 2A, the user inputs the closed loop 221 on the terminal screen including an object 210. For example, the interface unit 110 receives the first image and the input signal of the user and transmits the input signal of the user to the image generating unit 120.

The image generating unit 120 selects at least one of pixels included in the first image based on position information included in the input signal of the user. More specifically, by drawing the closed loop 221, the user determines which of the pixels included in the terminal screen is selected. The selected pixels are then used to divide areas in the first image.

Referring to the second image of FIG. 2A, the image generating unit 120 generates the second image by dividing the first image into several areas.

Specifically, the image generating unit 120 designates an outer area of the closed loop 221 as the third area 231, designates pixels located within a predetermined inner range of the closed loop 221 as the fifth area 232, and designates an area not corresponding to the third area 231 or the fifth area 232 as the second area 233. For example, the image generating unit 120 may designate an area corresponding to a width of ten pixels from among pixels corresponding to the closed loop 221 (that is, selected pixels) as the fifth area 232.

Based on the foregoing, there is a possibility that the object 210 may be included in the second area 233.

Referring to FIG. 1 again, the image generating unit 120 transmits the second image of FIG. 2A to the segmentation unit 130.

Figure 2B:
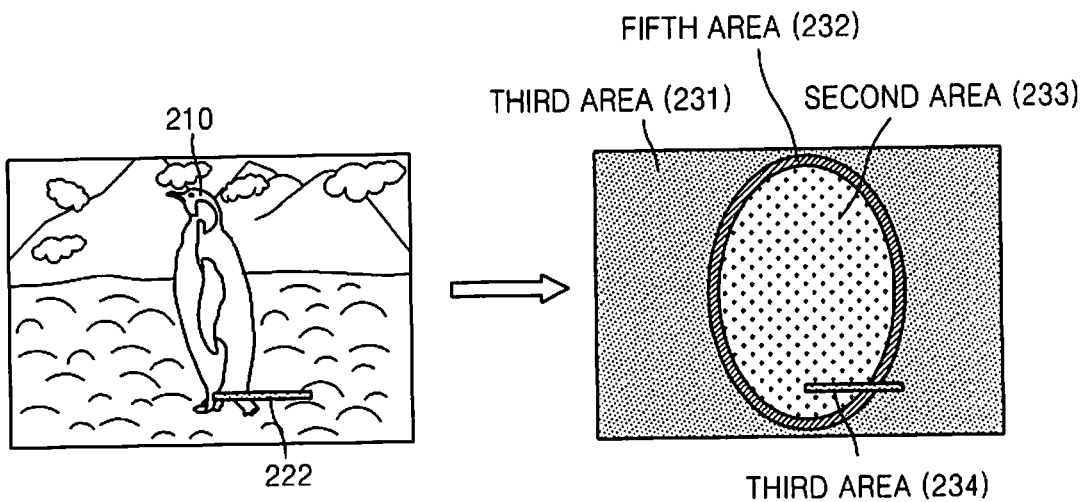

FIG. 2B illustrates an operation of generating a second image, e.g., by the image generating unit 120 illustrated in FIG. 1, when the user inputs another signal having a stroke form, after the operation described above with reference to FIG. 2A. Specifically, FIG. 2B illustrates an example in which the interface unit 110 receives a signal from the user, after the operation described with reference to FIG. 2A has been performed.

Referring to the first image in FIG. 2B, the user inputs a signal as a stroke 222 on the terminal screen including the object 210. Although illustrated as having a linear form in FIG. 2B, the signal in a stroke shape may have the linear form or a curved form.

The user inputs the stroke 222 to indicate a portion of the first image corresponding to a background, e.g., via a predetermined User Interface (UI) (not shown) that the user has selected on the terminal screen. The interface unit 110 receives the first image and the input signal of the user, and transmits the input signal of the user to the image generating unit 120.

The image generating unit 120 selects at least one of pixels included in the first image based on position information included in the input signal of the user. Specifically, the image generating unit 120 determines which of the pixels included in the terminal screen are designated by the stroke 222 input by the user, and selects the determined pixels. The selected pixels are used as a basis for dividing areas of the first image.

Referring to the second image of FIG. 2B, the image generating unit 120 generates the second image by dividing the first image into several areas. That is, the image generating unit 120 generates the second image, which is a new image, by refining the areas determined as described above with reference to FIG. 2A (that is, the third area 231, the fifth area 232, and the second area 233).

As described above with reference to FIG. 2A, an area in the closed loop 221 refers to an area of the first image where the object 210 may be included (that is, the second area 233). Accordingly, some of the pixels included in the second area 233 may actually correspond to pixels to be included in the background.

The image generating unit 120 may determine that the stroke 222 indicates a portion corresponding to the background according to a predetermined UI selected by the user. Thus, the image generating unit 120 may generate the second image, which is a new image, by refining an area of the pixels included in the second area 233 corresponding to the stroke 222, to a third area 234.

Referring to FIG. 1 again, the image generating unit 120 transmits the second image of FIG. 2B to the segmentation unit 130.

Figure 2C:
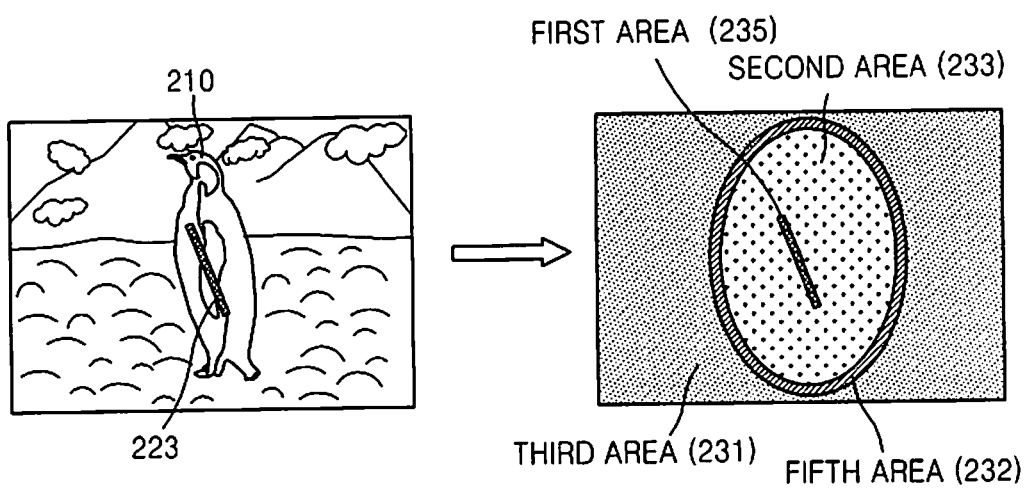

While FIG. 2C also illustrates an example in which the interface unit 110 receives an input signal from the user, after the operation described with reference to FIG. 2A has been performed, unlike FIG. 2B, FIG. 2C illustrates an example in which an input stroke 223 indicates a portion of the first image corresponding to a foreground, not the background.

Referring to the first image of FIG. 2C, the user inputs the stroke 223 indicating a portion of the first image corresponding to the foreground. The stroke 223 indicating the portion of the first image corresponding to the foreground may be implemented by the user's selecting a predetermined UI on the terminal screen and then inputting the stroke 223 via the selected UI.

Referring to the second image of FIG. 2C, the image generating unit 120 generates the second image by dividing the first image into several areas. That is, the image generating unit 120 generates the second image, which is a new image, by refining the areas determined as described above with reference to FIG. 2A (that is, the third area 231, the fifth area 232, and the second area 233).

The image generating unit 120 may determine that the stroke 223 indicates the portion corresponding to the foreground according to a predetermined UI selected by the user. Thus, the image generating unit 120 may generate the second image, which is a new image, by refining an area of the pixels included in the second area 233 corresponding to the stroke 223, to a first area 235.

Referring to FIG. 1 again, the image generating unit 120 transmits the second image of FIG. 2C to the segmentation unit 130.

Figure 2D:
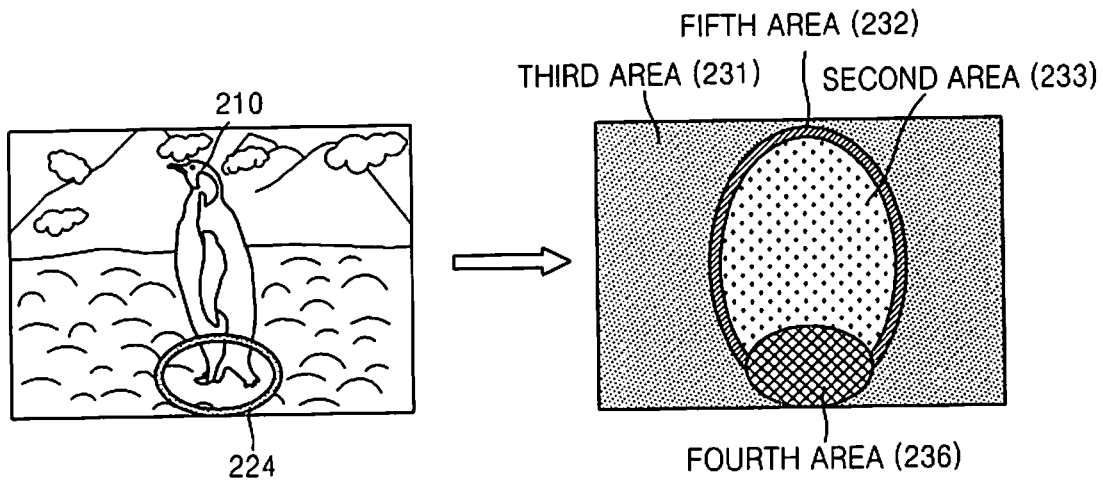
Figure 2E:
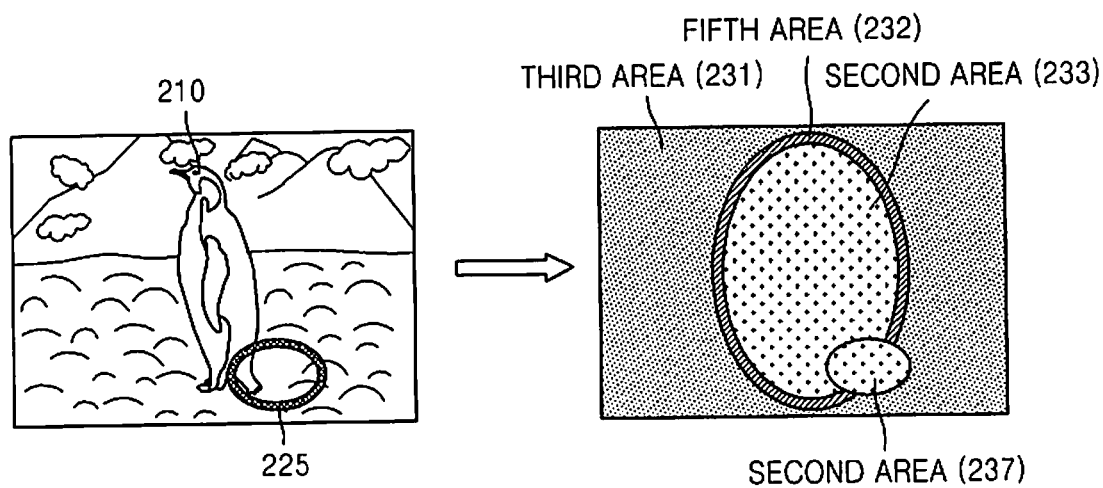

While FIGS. 2D and 2E also illustrate examples in which the interface unit 110 receives an input signal (closed loops 224 and 225) from the user, after the operation described with reference to FIG. 2A has been performed, unlike FIGS. 2B and 2C, FIGS. 2D and 2E illustrate examples in which another closed loop 224 or 225 is input, not a linear stroke.

Referring to FIG. 2D, the user inputs the closed loop 224 indicating a fourth area 236, and referring to FIG. 2E, the user inputs the closed loop 225 indicating a second area 237. The image generating unit 120 may determine whether pixels in the closed loop 224 or 225 indicate a fourth area 236 or a second area 237 according to a predetermined UI (not shown) selected by the user.

The image generating unit 120 may generate the second image, which is a new image, by refining the areas determined as described above with reference to FIG. 2A (that is, the third area 231, the fifth area 232, and the second area 233), by reflecting a type of the determined areas (the fourth area 236 or the second area 237).

Referring to FIG. 1 again, the image generating unit 120 transmits the second image from FIG. 2D or 2E to the segmentation unit 130.

As described above with reference to FIGS. 2B through 2E, the image generating unit 120 may refine the second image, which is previously generated, according to an additional input signal of the user. For example, as described above with reference to FIG. 2A, the image generating unit 120 generates the second image based on position information included in the input signal that is initially input by the user. Further, as described above with reference to FIGS. 2B through 2E, the image generating unit 120 may also generate a new second image by refining the previously generated second image by reflecting position information included in an additional input signal of the user. Thus, the image processing apparatus 100 may precisely segment an object in the first image through repeated interaction with the user.

Figure 2F:
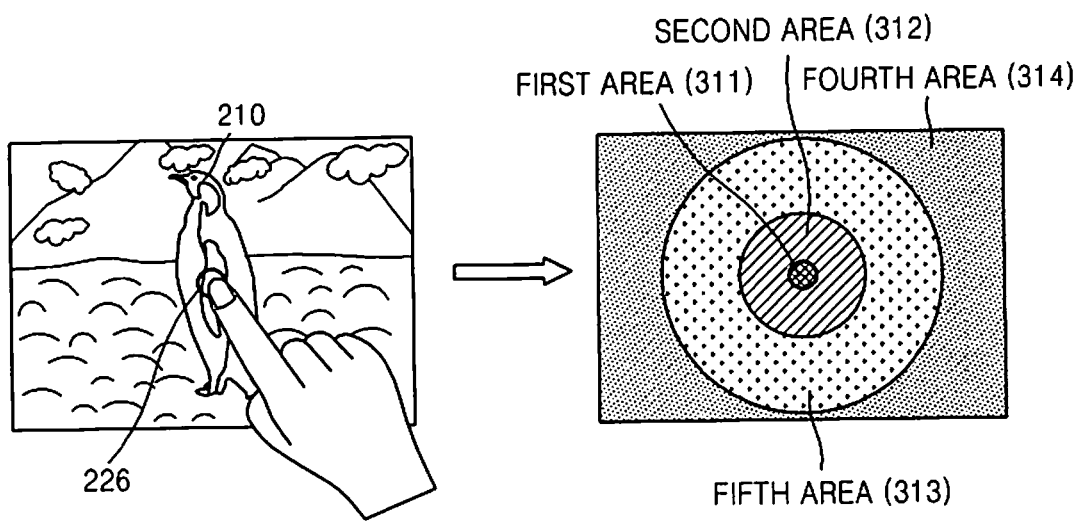

FIG. 2F illustrates an operation for generating a second image by the image generating unit 120, when the user touches a predetermined point 226 on the terminal screen.

Referring to the first image of FIG. 2F, the user inputs a touch input at the predetermined touch point 226 on the terminal screen including the object 210. For example, the user may touch a predetermined touch point 226 corresponding to the object 210 in the first image.

The image generating unit 120 selects a pixel corresponding to a touched point in the first image, based on position information included in the input signal of the user. The selected pixel is used as a basis for dividing areas of the first image.

Referring to the second image of FIG. 2F, the image generating unit 120 generates the second image by dividing the first image into several areas.

Specifically, the image generating unit 120 designates a pixel corresponding to the point 226 as the first area 311, designates, e.g., 100 pixels within a radius of the pixel designated as the first area 311 as the second area 312, designates 400 pixels within a radius of the pixel designated as the first area 311, minus the pixels included in the second area 232, as the fifth area 313, and designates an area of the image not corresponding to the first area 311, the second area 312, and the fifth area 313, as the fourth area 314.

Referring to FIG. 1 again, the image generating unit 120 transmits the second image of FIG. 2F to the segmentation unit 130.

Figure 2G:
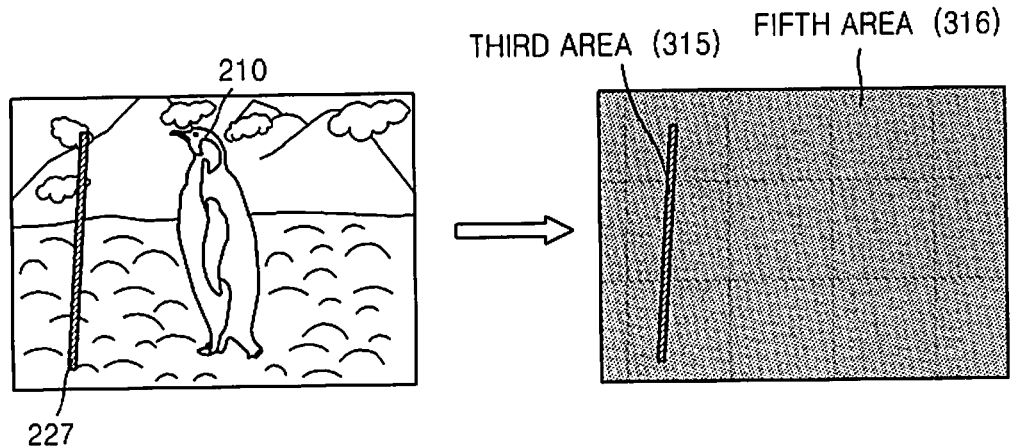
Figure 2H:
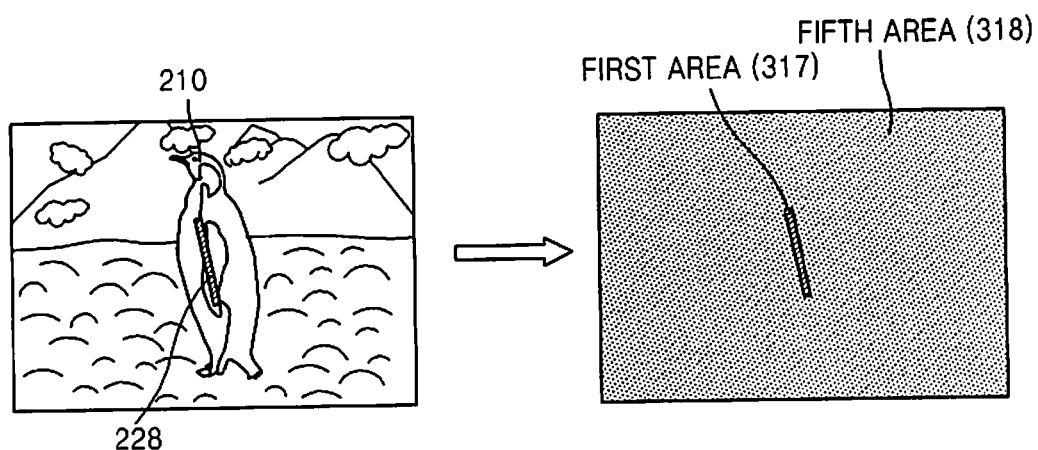

FIGS. 2G and 2H illustrate examples of generating the second image by the image generating unit 120, when a user inputs a signal as stroke 227 or 228 on the terminal screen.

As described above with reference to FIGS. 2B and 2C, if the user selects of a predetermined UI (not shown), the image generating unit 120 may determine whether the stroke 227 or 228 input by the user indicates a foreground or a background. Notably, a difference between the embodiments illustrated in FIGS. 2B and 2C and the embodiments illustrated in FIGS. 2G and 2H differ in regard to whether a second image that is previously generated exists. That is, in FIG. 2B or 2C, the image generating unit 120 generates the second image of FIG. 2B or 2C, after the closed loop signal is input first in FIG. 2A. However, in FIG. 2G or 2H, the image generating unit 120 generates the second image thereof as the stroke signal is input, without the closed loop signal first being input.

Referring to FIG. 2G, when an initial stroke 227 indicates a background, the image generating unit 120 designates pixels corresponding to the stroke 227 as a third area 315 and the other pixels as a fifth area 316.

Referring to FIG. 2H, when an initial stroke 228 indicates a foreground, the image generating unit 120 designates pixels corresponding to the stroke 228 as a first area 317 and the other pixels as a fifth area 318.

Referring to FIG. 1 again, the image generating unit 120 transmits the second image of FIG. 2G or 2H to the segmentation unit 130.

According to an embodiment of the present invention, the order of input the closed loop signal and the stroke signal is not limited. That is, based on an initial closed loop, a second image may be first generated, and then the second image may be generated based on a stroke signal that is input afterwards. Also, a second image may be generated based on an initially input stroke signal first and then the second image may be generated based on a closed loop signal that is input afterwards. Also, a second image may be generated based on an initially input closed loop signal, and then the second image may be generated based on a closed loop signal that is input afterwards. Also, a second image may be generated based on an initially input stroke signal, and then the second image may be generated based on a stroke signal that is input afterwards.

According to an embodiment of the present invention, the number of times a closed loop signal or a stroke signal is input is not limited. That is, the second image in which areas are precisely segmented may be generated by the user by repeatedly inputting, without any limitation, a closed loop signal or a stroke signal on the terminal screen on which the first image is displayed.

As described above with reference to FIGS. 2A through 2H, although the image generating unit 120 generates the second image according to an input signal of the user, e.g., a closed loop input or a stroke input (a manual mode), the embodiments of the present invention are not limited thereto.

For example, the image generating unit 120 may also generate the second image by automatically setting a boundary line that distinguishes a foreground and a background in the first image based on an input signal of the user (an automatic mode). Specifically, the image generating unit 120 automatically selects pixels corresponding to an outer line of an object based on an input signal of the user. The image generating unit 120 may designate, based on selected pixels, an area including the object as a first area or a second area and an area not including the object as a third area or a fourth area.

The segmentation unit 130 segments the object in the first image by using the first image and the second image.

Figure 3:
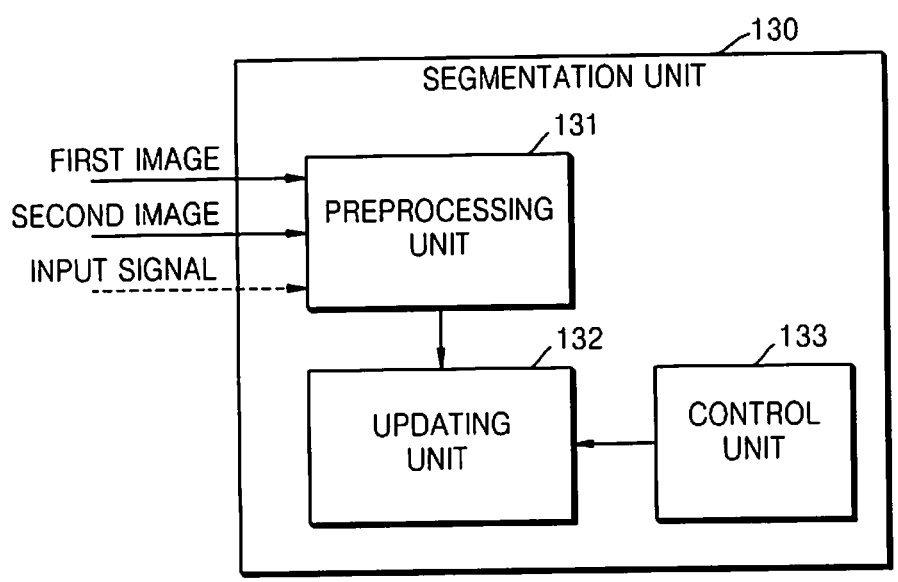
FIG. 3 illustrates a segmentation unit according to an embodiment of the present invention.

FIG. 3 illustrates a segmentation unit according to an embodiment of the present invention.

Referring to FIG. 3, the segmentation unit 130 includes a preprocessing unit 131, an updating unit 132, and a control unit 133.

Although the segmentation unit 130 illustrated in FIG. 3 includes only components related to the present embodiment, one of ordinary skill in the art will appreciate that other general-use components may also be included.

Further, the preprocessing unit 131, the updating unit 132, and the control unit 133 illustrated in FIG. 3 may also exist as independent devices.

The preprocessing unit 131, the updating unit 132, and the control unit 133 of the segmentation unit 130 illustrated in FIG. 3 may be realized as a single processor or multiple processors. A processor may be formed as an array including a plurality of logic gates or of a combination of a general-use microprocessor and a memory in which programs that are executable on the microprocessor are stored. Also, it will be obvious to one of ordinary skill in the art that the processor may be another hardware type processor.

The preprocessing unit 131 segments an object in a first image based on color information of pixels included in the first image and information of areas included in a second image. The color information refers to color values of respective pixels (that is, RGB values), and the information of the areas included in the second image refer to position values of the pixels included in the respective areas.

The updating unit 132 updates information about the segmented object based on information about areas that are updated by using the information about the segmented object and color information. The information about the segmented object refers to information of the object that is segmented a first time by using the preprocessing unit 131, and includes color values or position values of pixels included in the segmented object. Also, updating the information about the segmented object performed by the updating unit 132 refers to re-segmenting the already segmented object based on the information of the object that was segmented first by the preprocessing unit 131.

The control unit 133 controls the updating unit 132 to repeat the updating a predetermined number of times. That is, the control unit 133 controls the second segmentation of the object performed by the updating unit 132 based on the information of the object that was segmented first by the preprocessing unit 131 to be repeated a predetermined number of times.

According to an embodiment of the present invention, as the control unit 133 controls the updating unit 132 to repeat the updating a predetermined number of times, the segmentation unit 130 may precisely segment the object in the first image.

Figure 4:
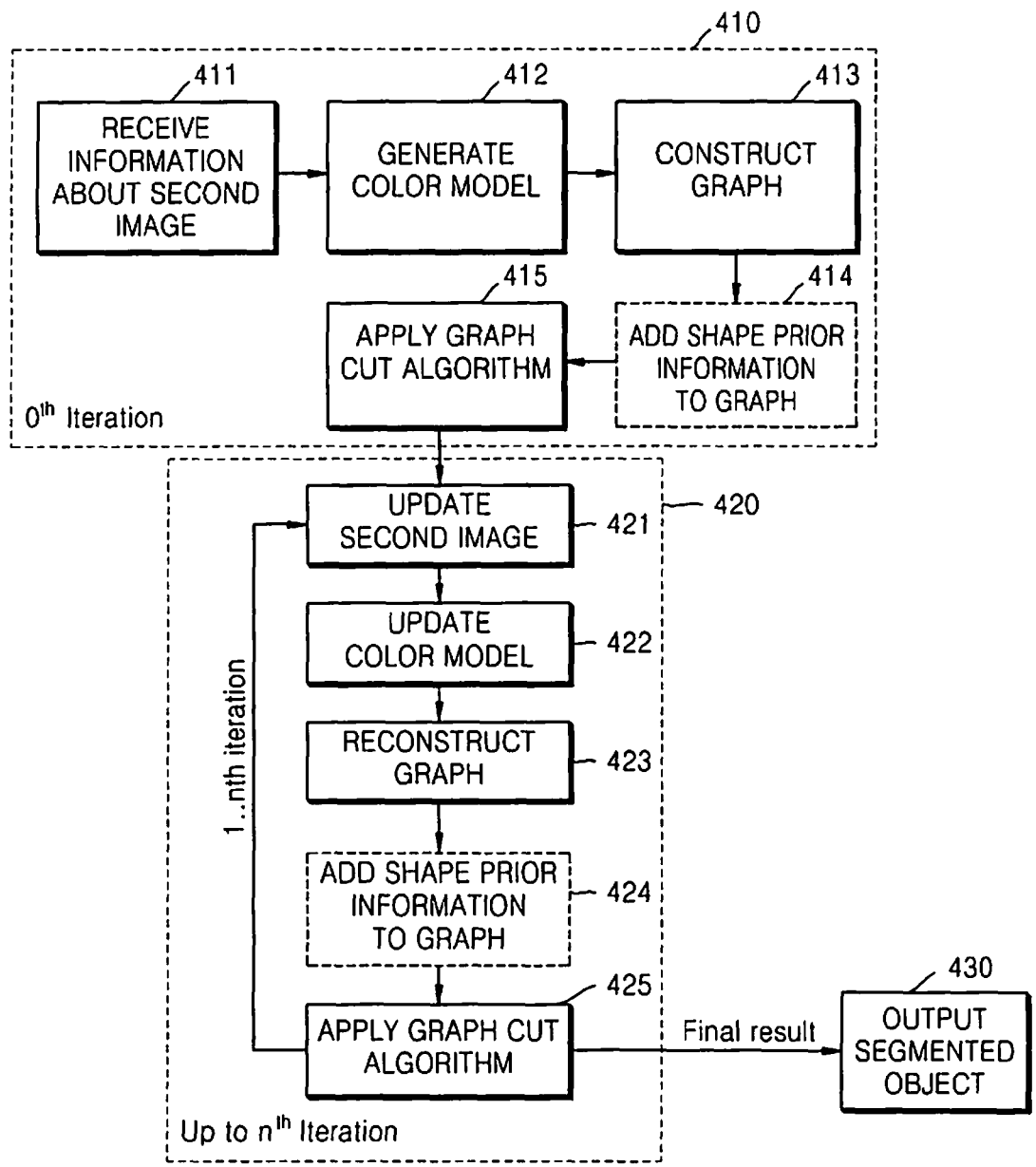
FIG. 4 illustrates an operation of a segmentation unit according to an embodiment of the present invention.

FIG. 4 illustrates an operation of a segmentation unit according to an embodiment of the present invention.

Referring to FIG. 4, steps included in block 410 are performed in the preprocessing unit 131, and steps included in block 420 are performed in the updating unit 132 and the control unit 133. More specifically, the updating unit 132 repeatedly performs steps 421 through 425 included in block 420, under the control of the control unit 133. The predetermined number of times may be determined by a user or may be preset in the image processing apparatus 100.

In step 411, the preprocessing unit 131 receives information about the second image from the image generating unit 120. Although not described in step 411, the preprocessing unit 131 also receives information about the first image from the interface unit 110.

In step 412, the preprocessing unit 131 generates a model using the information about the first image and the information about the second image. More specifically, the preprocessing unit 131 generates a foreground model and a background model based on color information of pixels included in the first image and information of areas included in the second image.

The preprocessing unit 131 generates a foreground model by using pixel values of pixels (that is, RGB values)

corresponding to a first area and a second area from among areas included in the second image, and generates a background model by using pixel values of pixels corresponding to a third area and a fourth area from among the areas included in the second image.

Methods of generating the foreground model and the background model by the preprocessing unit 131 are the same. Thus, only a method of generating the background model by using the preprocessing unit 131 will be described in detail.

A color image is formed of red, green, and blue pixels. Thus, the background model (or foreground model) according to an embodiment of the present invention may be a red color model, a green color model, and a blue color model.

Hereinafter, the method of generating the background model by the preprocessing unit 131 corresponds to a method of generating one of the three types of the background models. The methods of generating the other background model by the preprocessing unit 131 are the same. Also, the methods of generating the three types of foreground models by the preprocessing unit 131 are the same as the methods of generating the three types of background model.

The preprocessing unit 131 obtains position values of pixels corresponding to the third area and the fourth area from the information about the second image. Also, the preprocessing unit 131 obtains pixel values from the information about the first image according to the obtained position values.

The preprocessing unit 131 clusters the pixels corresponding to the third area and the fourth area into a predetermined number of groups by using a K-means clustering method. For example, the predetermined number may be five, but is not limited thereto.

The preprocessing unit 131 obtains a parameter of the background model by applying a Gaussian Mixture Model (GMM) with respect to each of the clustered groups. A parameter of the background model refers to a weight that is dependent upon the number of pixels having a mean value of the pixel values included in the respective groups, a Gaussian mean, and covariance.

According to an embodiment of the present invention, the preprocessing unit 131 may determine an appropriate number of Gaussian values, when applying a GMM with respect to each of the clustered groups.

In general, the number of Gaussian values used in a GMM is fixed. For example, five Gaussian values are used in a GMM applied to a predetermined object. However, the appropriate number of Gaussian values used in a GMM may vary according to a type of an image. For example, in the case of an image in which an object is located in a complicated background and an image in which an object is located in a pure-white background, the appropriate number of Gaussian values may be different.

Thus, the preprocessing unit 131 may adaptively determine a number of Gaussian values used in a GMM according to a type of an input first image. The preprocessing unit 131 may individually determine the number of Gaussian values with respect to each of a GMM applied when generating a parameter of the background model and a GMM applied when generating a parameter of the foreground model.

By performing the same operation as generating the background model (that is, the three types of background models), the preprocessing unit 131 generates a foreground model by using the pixel values of the pixels corresponding to the first area and the second area (that is, three types of models background models).

In step 412, the preprocessing unit 131 generates a background model and a foreground model when the first image is a color image. When the first image is a grayscale image, the preprocessing unit 131 may generate a background model and a foreground model by using a method different from the above-described method.

More specifically, when the first image is a grayscale image, it is not effective for the preprocessing unit 131 to generate the background model and the foreground model as color models, because pixels of the first image do not indicate a red, green or blue color. Thus, it may not be efficient for the preprocessing unit 131 to generate the background model and the foreground model as color models.

If the first image is a grayscale image, a method of generating a foreground model by the preprocessing unit 131 is the same as a method of generating a background model.

If the first image is a grayscale image, the background model may be formed of a gray scale intensity, a first texture parameter, and a second texture parameter. Compared to when the first image is a color image in which the background model is formed of a red color model, a green color model, and a blue color model, when the first image is a grayscale image, the background model is formed of a gray scale intensity, a first texture parameter, and a second texture parameter.

To obtain a gray scale intensity, a first texture parameter, and a second texture parameter, the preprocessing unit 131 obtains positions values of pixels corresponding to the third area and the fourth area from the information about the second image. Also, the preprocessing unit 131 obtains gray scale intensities from the information about the first image from the obtained position values.

The preprocessing unit 131 obtains horizontal textures of pixels corresponding to the third area and the fourth area of the first image. Thereafter, the preprocessing unit 131 determines the horizontal textures as a first texture parameter.

The preprocessing unit 131 obtains vertical textures of pixels corresponding to the third area and the fourth area of the first image. Thereafter, the preprocessing unit 131 determines the vertical textures as a second texture parameter.

By performing the same operation to generate the background model (that is, a gray scale intensity, a first texture parameter, and a second texture parameter included in the background model), the preprocessing unit 131 generates a foreground model by using the pixel values of the pixels corresponding to the first area and the second area (that is, a gray scale intensity, a first texture parameter, and a second texture parameter included in the foreground model).

In step 413, the preprocessing unit 131 constructs a graph by using the generated models. More specifically, the preprocessing unit 131 constructs a graph representing an energy function of the pixels included in the first image by combining a data term (color term) indicating a similarity between pixels included in the first image with a smoothness term indicating a similarity between adjacent pixels.

More specifically, the preprocessing unit 131 may calculate energy values (E(f), edge value) of the pixels included in the first image by using Equation (1) below.

$$E(f) = \sum_{p \in P} D_p(f_p) + \lambda \sum_{(p,q) \in N} I_{pq}(f_p, f_q) \qquad (1)$$

In Equation (1), $D_p(f_p)$ denotes a data term indicating how similar a color value of a pixel p is to the foreground model and the background model. When the pixel p included in the first image P is similar to prior information regarding fp, $D_p(f_p)$ is assigned with a low cost, otherwise, a high cost is assigned. Here, fp denotes a foreground model or a background model.

In Equation (1), $V_{pq}(f_p, f_q)$ denotes a smoothness term which is determined based on intensities of adjacent pixels. The smoothness term functions as a reference for generating discontinuity between pixels having similar intensities. That is, the smoothness term indicates a continuity with respect to adjacent pixels, and when two adjacent pixels p and q are similar to each other, $V_{pq}(f_p, f_q)$ is assigned with a high cost, and when not similar, a low cost is assigned. Here, fp and fq denote a foreground model and a background model, respectively.

In Equation (1), $\lambda$ is a weight indicating relative importance between the data term and the smoothness term, and N is a set of pairs of adjacent pixels of the first image and indicates n-links (neighborhood links).

According to an embodiment of the present invention, the preprocessing unit 131 may change the weight $\lambda$. When a graph is constructed based on Equation (1), in general, the weight $\lambda$ indicates a constant value. That is, Equation (1) typically uses the weight $\lambda$ which is constant, regardless of a difference in resolutions of portions of the first image or an amount of noise included in the first image.

According to an embodiment of the present invention, the preprocessing unit 131 may change the weight $\lambda$, which is preset to a different value, according to a probability that an object is to be segmented in the first image or by optimizing the weight $\lambda$ by using three or more different candidate weights. According to a resolution of the first image or the amount of the noise of the first image, a probability that an object may be segmented in the first image may be different. For example, if the resolution of the first image is higher, a probability that the object is segmented from the first image may be higher, and if the resolution of the first image is lower, a probability that the object is segmented from the first image may be lower. Thus, the preprocessing unit 131 according to an embodiment of the present invention may change the preset weight $\lambda$ to a different value according to the probability that the object is segmented in the first image or by optimizing the weight $\lambda$ by using three or more different candidate weights.

In step 415, the preprocessing unit 131 applies a graph cut algorithm to the graph, and if it is determined that an object is not segmentable in the first image, as a result of applying the graph cut algorithm, the preprocessing unit 131 may change the preset weight $\lambda$ to a different value. That is, if the preprocessing unit 131 has determined that the object is not segmentable from the first image, the weight $\lambda$ may be changed to a different value. Values to which the weight $\lambda$ may be changed may be preset in the image processing apparatus 100.

According to an embodiment of the present invention, the weight $\lambda$ is changed to a different value when the preprocessing unit 131 has determined that the object is not segmentable in the first image, reducing excessive computational time and accurately segmenting the object in the first image.

Also, the preprocessing unit 131 may change the preset weight $\lambda$ to a different value by optimizing the weight $\lambda$ by using three or more different candidate weights.

FIG. 8 is a flowchart illustrating an operation of optimizing a weight $\lambda$ by using a preprocessing unit according to an embodiment of the present invention.

In steps 811 through 813, the preprocessing unit 131 applies a graph cut algorithm to a graph generated based on three different candidate weights $\lambda_{low}$, $\lambda_{optimal}$, and $\lambda_{high}$ to segment the object in the first image. That is, the preprocessing unit 131 applies the three different weights $\lambda_{low}$, $\lambda_{optimal}$, and $\lambda_{high}$ to Equation (1), and applies a graph cut algorithm to each of three types of energy values E(f) of the three types calculated by using the three candidate weights $\lambda_{low}$, $\lambda_{optimal}$, and $\lambda_{high}$ to thereby segment the object in the first image.

The candidate weights $\lambda_{low}$, $\lambda_{optimal}$, and $\lambda_{high}$ may be preset values set in the image processing apparatus 100. Also, although the preprocessing unit 131 applies a graph cut algorithm based on the three different candidate weights $\lambda_{low}$, $\lambda_{optimal}$, and $\lambda_{high}$ above, the number of candidate weights is not limited. That is, more candidate weights may be set according to performance of the image processing apparatus 100 or a state of the first image.

In step 820, the preprocessing unit 131 tests a result of segmenting the object in the first image based on a switching criterion. Specifically, the preprocessing unit 131 tests a result of each of steps 811 through 813, based on the switching criterion.

As an example of the switching criterion, the preprocessing unit 131 may use a boundary box test. Specifically, the preprocessing unit 131 measures a proximity between an outer line of the object obtained as a result of each of steps 811 through 813 and an initially input closed loop. For example, the preprocessing unit 131 may calculate a proximity between the outer line of the object and the initially input closed loop as a numerical value.

The preprocessing unit 131 determines whether the switching criterion is met by comparing the proximity with a predetermined critical value. For example, when proximity is higher than the critical value, the preprocessing unit 131 may determine that the switching criterion is met, but the embodiments of the present invention are not limited thereto. When at least one test indicates the switching criterion is met in step 830, the method proceeds to step 831; otherwise, when none of tests indicate the switching criterion is met in step 840, the method proceeds to step 841.

In step 831, the preprocessing unit 131 selects a candidate weight having a highest value from among candidate weights that have met the switching criterion and changes the preset weight $\lambda$ to the selected candidate weight.

In step 841, the preprocessing unit 131 analyzes results of segmenting the object in the first image. That is, the preprocessing unit 131 analyzes results of segmenting the object in the first image through steps 811 through 813 described above. For example, if a value of a candidate weight is smaller, the preprocessing unit 131 examines whether an area of the first image is which the object is segmented increases. If the area of the first image in which the object is segmented increases as the candidate weight is smaller, the method proceeds to step 842; otherwise, the method proceeds to step 843.

In step 842, the preprocessing unit 131 selects a candidate weight $\lambda_{very\ low}$ having a lowest value from among candidate weights and changes the preset weight $\lambda$ to the selected candidate weight $\lambda_{very\ low}$.

In step 843, the preprocessing unit 131 determines that a desired result is not found in the candidate weights, sets a weight $\lambda_{fail-safe}$ that is different from the candidate weights, and changes the preset weight $\lambda$ to the set weight $\lambda_{fail-safe}$.

According to an embodiment of the present invention, as the preprocessing unit 131 changes the preset weight λ to a different value based on a result of optimizing the weight λ based on the candidate weights, the object may be accurately segmented in the first image.

Referring again to FIG. 4, in step 414, the preprocessing unit 131 adds shape prior information to the constructed graph. However, step 414 is an optional step and is performed, for example, when the image processing apparatus 100 receives an external input signal. An external input signal denotes an input signal including predetermined position information in a foreground area. For example, a stroke input by a user with respect to a position in the foreground area may be an external input signal.

According to an embodiment of the present invention, the object may be precisely segmented in the first image as the preprocessing unit 131 adds the shape prior information to the graph and the control unit 133 repeatedly performs the operation of the updating unit 132.

Referring again to FIG. 1, the interface unit 110 receives an input signal including information about a predetermined position in a foreground area from among areas included in the second image (for example, a stroke input). The interface unit 110 then transmits the input signal to the segmentation unit 130 (specifically, the preprocessing unit 131) and the preprocessing unit 131 obtains shape prior information based on the input signal.

Referring again to FIG. 4, in step 414, the preprocessing unit 131 selects at least one of the pixels included in the foreground area, based on position information included in the input signal. For example, the preprocessing unit 131 selects pixels included on a path of a stroke signal in the foreground area.

Thereafter, the preprocessing unit 131 determines an initially selected pixel from among the selected pixels. That is, the preprocessing unit 131 determines a pixel corresponding to a starting point of the stroke.

The preprocessing unit 131 calculates a visibility of pixels indicating the object from among the determined pixels. Specifically, the preprocessing unit 131 determines the determined pixels as a geodesic star and connects all pixels included in the foreground area with the geodesic star center by using a shortest geodesic path. That is, the preprocessing unit 131 constructs a geodesic forest.

The preprocessing unit 131 calculates a visibility of the pixels by using the geodesic forest and obtains shape prior information by using the visibilities. Thereafter, the preprocessing unit 131 adds the shape prior information to the graph.

When the shape prior information is added, the preprocessing unit 131 uses Equation (2) below to calculate an energy value (E(f), edge value) of each of the pixels included in the first image.

$$E(f) = \sum_{p \in P} D_p(f_p) + \lambda \sum_{(p,q) \in N} I^-_{pq}(f_p, f_q) + \sum_{(p,q) \in N} S_{pq}(f_p, f_q) \quad (2)$$

In Equation (2), $D_p(f_p)$, $V_{pq}(f_p, f_q)$, and λ are the same as described with reference to Equation (1). Also, $S_{pq}(f_p, f_q)$ in Equation (2) corresponds to shape prior information. Also, the changing of the preset weight λ to a different value by the preprocessing unit 131 according to a probability that an object is segmented or by optimizing the weight λ by using three or more different candidate weights is as described above with reference to step 413 and FIG. 8.

As described above, as the preprocessing unit 131 constructs the graph by adding shape prior information, the image processing apparatus 100 may precisely segment an object in the first image. Also, based on interaction with the user in a construction process, the image processing apparatus 100 may segment the object in the first image according to the user's intention.

In step 415, the preprocessing unit 131 segments the object in the first image by applying a graph cut algorithm to the constructed graph. That is, the preprocessing unit 131 segments the object from the first image a first time by applying a graph cut algorithm to the graph constructed in step 413 or in step 414. The graph cut algorithm refers to an algorithm in which a graph is cut by using a threshold value so as to segment pixels included in the first image into pixels corresponding to the object and pixels not corresponding to the object.

When the object obtained by segmentation includes at least one defect, the preprocessing unit 131 removes the at least one defect.

Figure 7A:
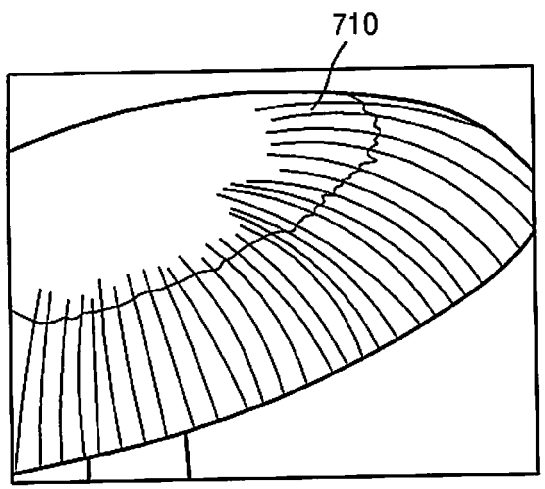
FIGS. 7A and 7B illustrate a defect in a segmented object, according to an embodiment of the present invention.
Figure 7B:
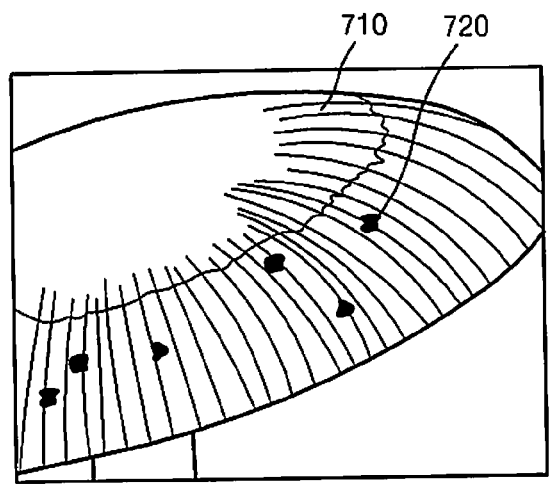

FIGS. 7A and 7B illustrate a defect in a segmented object according to an embodiment of the present invention.

Referring to FIG. 7A, an object 710 segmented in a first image is illustrated. However, referring to FIG. 7B, the object 710 includes defects 720, which denote isolated islands of pixels present in the object 710.

When an object is segmented in a first image by the preprocessing unit 131 by applying a graph cut algorithm to a graph, the defects 720 may be present in the object 710. That is, when the preprocessing unit 131 applies a graph cut algorithm, small closed curves may occur in the object 710. The small closed curves may be generated when background pixels that are incorrectly distinguished in the foreground area exist or when foreground pixels that are incorrectly distinguished in the background area exist.

When at least one defect 720 exists in the segmented object 710, the preprocessing unit 131 may remove the at least one defect 720. Accordingly, as the preprocessing unit 131 performs step 415, a quality of the segmented object 710 may be improved.

Referring again to FIG. 4, in step 421, the updating unit 132 updates the second image by using information about the object that is segmented first by the preprocessing unit 131. Specifically, the updating unit 132 updates pixels of the second area and the fourth area included in the second image by using the information about the object segmented the first time. When a portion of the second area or the fourth area is segmented in the previous second image as an object, the updating unit 132 removes the area segmented as the object from the second area or the fourth area.

In step 422, the updating unit 132 updates a model by using the information about the first image or the information about the second image. Specifically, the updating unit 132 updates a foreground model and a background model that are previously generated based on color information of pixels included in the first image and information of areas included in the updated second image.

The updating unit 132 updates the foreground model by using pixel values (that is, RGB values) of pixels corresponding to the first area and the second area from among areas included in the updated second image. Also, the updating unit 132 updates the background model by using pixel values of pixels corresponding to a third area and a fourth area from among the areas included in the updated second image.

Methods of generating a foreground model and a background model by using the updating unit 132 are the same.

Thus, hereinafter, only a method of generating a background model by using the updating unit 132 will be described in detail.

The updating unit 132 obtains position values of pixels corresponding to the third area and the fourth area from the information about the updated second image. Also, the updating unit 132 obtains pixel values from the information about the first image according to the obtained position values.

Thereafter, the updating unit 132 assigns pixels to the groups clustered by the preprocessing unit 131 in step 412. That is, the updating unit 132 assigns pixels corresponding to the third area and the fourth area to the groups clustered by the preprocessing unit 131. That is, the updating unit 132 uses the groups clustered by the preprocessing unit 131, without having to additionally cluster pixels corresponding to the third area and the fourth area.

Thereafter, the updating unit 132 updates a parameter of a background model by applying a GMM with respect to each of the clustered groups. The parameter of the background model refers to a weight that is dependent upon the number of pixels having a mean value of pixel values included in each group, a Gaussian mean, and covariance.

The updating unit 132 may adaptively determine the number of Gaussian values used in a GMM according to a type of an input first image. A method of adaptively determining the number of Gaussian values by using the updating unit 132 is as described above with reference to step 412.

The updating unit 132 updates the foreground model by using the pixel values of pixels corresponding to the first area and the second area (that is, the updating unit 132 updates the parameter of the foreground model) by performing the same operation to generate the background model.

When the first image is a grayscale image, the updating unit 132 updates a gray scale intensity, a first texture parameter, and a second texture parameter included in the background model to update the background model. Also, the updating unit 132 may update the foreground model in the same manner as presented with respect for the background model.

In step 423, the updating unit 132 reconstructs a graph by using the updated models. Specifically, the preprocessing unit 131 reconstructs a graph representing an energy function of pixels included in the first image by combining a data term indicating a similarity between pixels included in the first image and a smoothness term indicating a similarity between adjacent pixels. Also, a method of reconstructing a graph by using the updating unit 132 is as described above with reference to step 413. Also, the updating unit 132 may change the weight λ. A method of modifying the weight λ by using the updating unit 132 is as described above with reference to step 413.

In step 424, the updating unit 132 adds shape prior information to the reconstructed graph. However, step 424 is a selective step and is performed, e.g., when the image processing apparatus 100 receives an external input signal. An external input signal denotes an input signal including information about a predetermined position in a foreground area, e.g., a stroke input by a user with respect to a position in the foreground area.

The updating unit 132 adds the shape prior information obtained by using the preprocessing unit 131 to the reconstructed graph. A method of obtaining shape prior information by using the preprocessing unit 131 and a method of adding the shape prior information to the reconstructed graph by using the updating unit 132 are as described above with reference to step 414. Also, as described above with reference to step 423, the updating unit 132 may change the weight λ.

In step 425, the updating unit 132 segments the object in the first image by applying a graph cut algorithm to the reconstructed graph. That is, the preprocessing unit 131 segments the object in the first image a second time by applying the graph cut algorithm to the graph reconstructed in step 423 or the graph reconstructed in step 424. The graph cut algorithm refers to an algorithm whereby a graph is cut by using a threshold value so as to segment pixels included in the first image into pixels corresponding to the object and pixels not corresponding to the object.

When the segmented object includes at least one defect, the updating unit 132 removes the at least one defect.

The control unit 133 controls the updating unit 132 to repeat the operation a predetermined number of times. In detail, the control unit 133 controls the updating unit 132 to repeat an operation fed back from steps 425 to step 421a predetermined number of times.

In step 430, a finally segmented object is output, after the updating unit 132 has repeatedly updated the segmented object a predetermined number of times.

According to an embodiment of the present invention, when the updating unit 132 outputs the finally segmented object, a graph may be reconstructed with respect to an area corresponding to an outer line of the object (that is, a boundary line between the object and the background), and a graph cut algorithm may be applied to the reconstructed graph.

In general, when an object is segmented in an image, the size of the image is reduced in order to reduce an operation time and a segmentation algorithm is applied to the reduced-size image. Thereafter, the image is restored to its original size, and the image with the original size is output. In this case, when the size of the segmented image is increased, the outer line of the segmented object may not be uniform.

When outputting the finally segmented object, the updating unit 132 may reconstruct a graph with respect to the outer line of the object and apply a graph cut algorithm to the reconstructed graph to thereby output the finally segmented object with a smooth and clear outer line. Thus, the updating unit 132 may output an object that is clearly segmented.

Referring to FIG. 3 again, the updating unit 132 may store the object in a storage unit (not shown) as steps 421 through 425 are performed. For example, when it is assumed that the updating unit 132 has repeated steps 421 through 425 five times, objects that are segmented according to the respective number of times (that is, a total of five objects) may be stored in the storage unit (not shown). Thus, a user may use an undo or redo button displayed on a terminal screen to selectively output objects stored in the storage unit.

Figure 5:
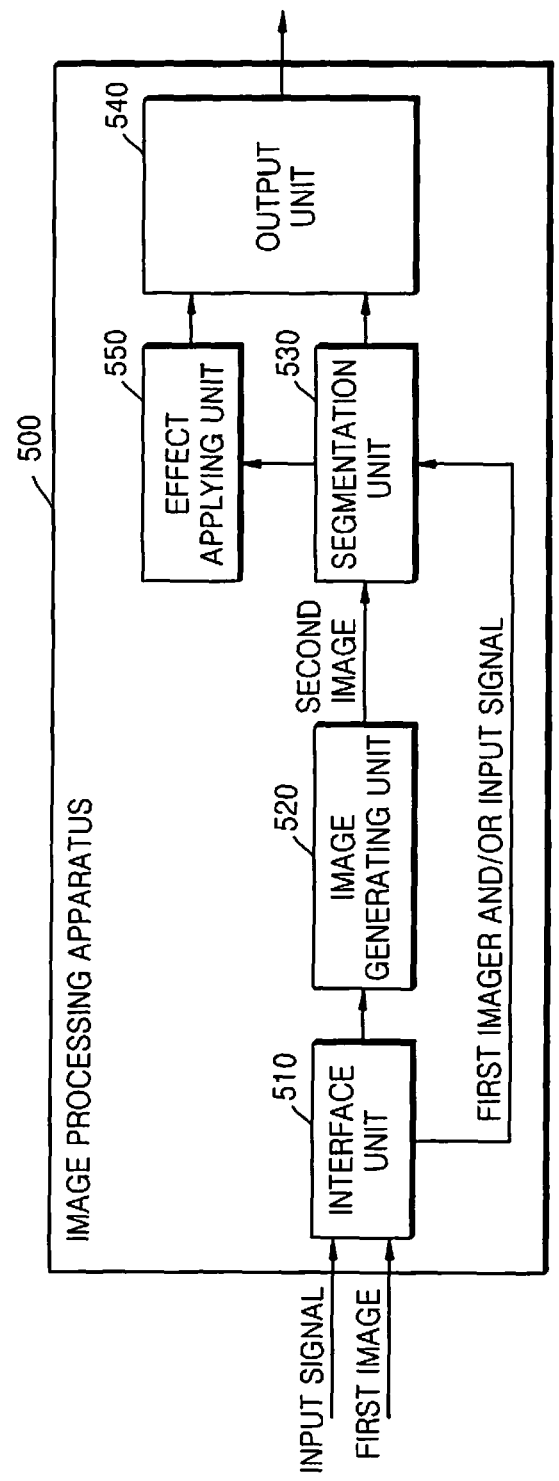
FIG. 5 illustrates an image processing apparatus according to an embodiment of the present invention.

FIG. 5 illustrates an image processing apparatus according to an embodiment of the present invention.

Referring to FIG. 5, the image processing apparatus 500 includes an interface unit 510, an image generating unit 520, a segmentation unit 530, an effect applying unit 550, and an output unit 540. Although the image processing apparatus 500 illustrated in FIG. 5 includes only components related to the present embodiment, it will be obvious to one of ordinary skill in the art that other general-use components may also be added.

Also, it will be obvious to one of ordinary skill in the art that the interface unit 510, the image generating unit 520, the segmentation unit 530, the effect applying unit 550, and the output unit 540 of the image processing apparatus 500 may also exist as independent devices.

The interface unit 510, the image generating unit 520, the segmentation unit 530, the effect applying unit 550, and the output unit 540 of the image processing apparatus 500 illustrated in FIG. 5 may also be realized as a single or multiple processors. A processor may include an array including a plurality of logic gates or of a combination of a general-use microprocessor and a memory in which programs that are executable on the microprocessor are stored. Also, it will be obvious to one of ordinary skill in the art that the processor may also be another hardware type processor.

In addition, the interface unit 510, the image generating unit 520, and the segmentation unit 530 illustrated in FIG. 5 are the same as the interface unit 110, the image generating unit 120, and the segmentation unit 130 illustrated in FIG. 1.

The effect applying unit 550 applies a predetermined effect to pixels indicating an area not including the segmented object. Specifically, the effect applying unit 550 may apply a predetermined effect to pixels indicating a background area transmitted by using the segmentation unit 530.

For example, the predetermined effect refers to processing such as a background blur, a motion blur, an edge filter, a background swapping, or a black and white background.

The output unit 540 outputs an image where an area indicating the segmented object and an area not including the segmented object are distinguished. Specifically, the output unit 540 may output an image wherein an area indicating the object transmitted by using the segmentation unit 530 and an area not including the segmented object are distinguished from each other. For example, the image may be an image including a line along an outer line of the object, but is not limited thereto.

The output unit 540 may output an image including an area indicating the segmented object and an area to which an effect is applied. Specifically, the output unit 540 may output an area including an object transmitted by the effect applying unit 550 and an area to which an effect is applied.

Figure 6:
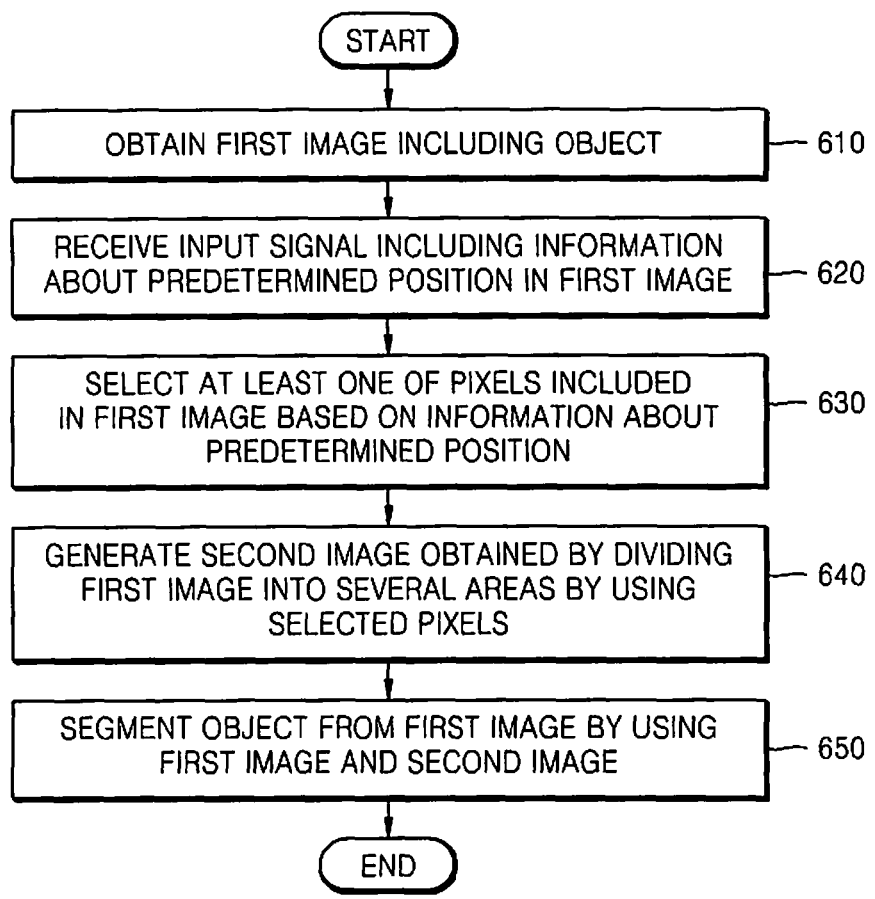
FIG. 6 is a flowchart illustrating a method of segmenting an object, according to an embodiment of the present invention.

FIG. 6 is a flowchart of a method of segmenting an object, according to an embodiment of the present invention.

Referring to FIG. 6, the method of segmenting an object includes operations that are performed in a time series in the image processing apparatuses 100 and 500 illustrated in FIGS. 1 and 5.

In step 610, the interface unit 110 (or 510) obtains a first image including an object.

In step 620, the interface unit 110 (or 510) receives an input signal including information about a predetermined position in the first image.

In step 630, the image generating unit 120 (or 520) selects at least pixel included in the first image, based on the information about the predetermined position.

In step 640, the image generating unit 120 (or 520) generates a second image, which is obtained by segmenting the first image into several areas, based on the selected at least one pixel.

In step 650, the segmentation unit 130 (or 530) segments an object in the first image by using the first image and the second image. Specifically, the segmentation unit 130 (or 530) precisely conducts object segmentation in the first image by repeating the operation of segmenting the object in the first image.

As described above, according to a method for segmenting an object in an image according to an embodiment of the present invention, an image indicating an object may be accurately segmented in an input image by repeatedly applying the algorithm described above. Also, the object may be more properly segmented in the input image according to the user's intention based on interaction with the user.

In addition, after segmenting the image indicating an object in the input image, various effects may be applied to the background image, and thus, the image may be edited as desired.

The above-described method applies not only to a fixed still image but also to a video, wherein an object moves in real time. Specifically, even when the first image is a video, the image processing apparatus 100 may segment a moving object in real time in the first image.

For example, the image processing apparatus 100 captures a most recent frame from the first image and segments the object in the captured frame. Also, the image processing apparatus 100 outputs the segmented object. Thereafter, the image processing apparatus 100 recaptures the most recent frame in the first image and segments the object again in the captured frame. The image processing apparatus 100 outputs the segmented object.

Thus, when the first image is a video image, the image processing apparatus 100 may also segment the moving object in the first image in real time.

As described above, according to the one or more of the above embodiments of the present invention, an object may be accurately segmented in an input image by repeatedly applying the algorithm described above. Also, the object may be more properly segmented in the input image according to the user's intention based on interaction with the user.

In addition, after segmenting the object in the input image, various effects may be applied to the background image, and thus, the image may be edited as desired.

The embodiments of the present invention can be written as computer programs and can be implemented in general-use digital computers that execute the programs using a computer readable recording medium. Also, data structures used in the embodiments of the present invention may be written to the computer readable recording medium using various means. Examples of the computer readable recording medium include magnetic storage media (e.g., Read Only Memory (ROM), Random Access Memory (RAM), USB, floppy disks, hard disks, etc.), optical recording media (e.g., Compact Disc ROMs (CD-ROMs), or Digital Versatile Discs (DVDs)), and storage media such as Peripheral Component Interconnect (PCI) interfaces (e.g., PCI, PCI-express, or Wi-Fi).

While the present invention has been shown and described with reference to certain embodiments thereof, it will be understood by those skilled in the art that various changes in form and detail may be made therein without departing from the spirit and scope of the present invention as defined by the appended claims and their equivalents.

What is claimed is:

1. A method of segmenting an object in an image, the method comprising:
    obtaining a first image including the object;
    receiving an input signal on the first image;
    obtaining position information based on the received input signal;
    selecting, by a processor, at least one pixel included in the first image, based on the position information;
    generating, by the processor, a second image by dividing the first image into several areas, using the selected at least one pixel; and
    segmenting, by the processor, the object in the first image by using the first image and the second image.

2. The method of claim 1, wherein segmenting the object comprises segmenting the object in the first image based on color information of pixels included in the first image and information of several areas included in the second image.

3. The method of claim 2, further comprising
updating information about the segmented object based on color information and information about the several areas that are updated using information about the segmented object,
wherein updating is performed a predetermined number of times.

4. The method of claim 2, wherein segmenting the object in the first image based on the color information comprises:
generating a foreground model and a background model based on the color information and the information about the several areas;
constructing a graph of an energy function of the pixels included in the first image by combining a data term indicating a similarity between the pixels included in the first image with a smoothness term indicating a similarity between adjacent pixels; and
segmenting the object in the first image by applying a graph cut algorithm to the constructed graph.

5. The method of claim 3, wherein updating the information about the segmented object comprises:
updating the several areas included in the second image by using information about the segmented object;
updating a foreground model and a background model that are previously generated, based on the color information and the updated information about the several areas;
reconstructing a graph of an energy function of pixels included in the first image by combining a data term indicating a similarity between the pixels included in the first image and a smoothness term indicating a similarity between adjacent pixels; and
updating the information about the segmented object by applying a graph cut algorithm to the reconstructed graph.

6. The method of claim 2, further comprising:
receiving an input signal on a foreground area from the several areas;
obtaining position information based on the received input signal; and
obtaining shape prior information based on the input signal,
wherein segmenting the object in the first image further comprises adding the shape prior information.

7. The method of claim 6, wherein obtaining the shape prior information comprises:
selecting at least one pixel included in the foreground area based on the position information;
calculating visibilities of pixels indicating the object based on an initially selected pixel from among the selected at least one pixel; and
obtaining the shape prior information using the visibilities.

8. The method of claim 6, wherein updating the information about the segmented object comprises updating the information about the segmented object by further including the shape prior information.

9. The method of claim 1, further comprising outputting an image in which an area indicating the segmented object and an area indicating an area not including the segmented object are distinguished from each other.

10. The method of claim 1, further comprising:
applying a predetermined effect to pixels indicating an area not including the segmented object; and
outputting an image including the area indicating the segmented object to which the predetermined effect is applied.

11. The method of claim 10, wherein the predetermined effect includes at least one of a background blur, a motion blur, an edge filter, a background swapping, and a black and white background.

12. The method of claim 1, wherein the input signal comprises at least one of a closed loop signal, a stroke signal, and a signal that designates a predetermined position on the first image.

13. The method of claim 1, wherein receiving the input signal comprises receiving a user input being drawn as a closed loop at a predetermined position on the first image, and
wherein selecting the at least one pixel comprises selecting pixels corresponding to a track of the closed loop.

14. The method of claim 1, wherein receiving the input signal comprises receiving a user input drawn as a stroke at a predetermined position on the first image, and
wherein selecting the at least one pixel comprises selecting pixels corresponding to a track of the stroke.

15. The method of claim 1, wherein receiving the input signal comprises receiving a user input through which a predetermined position on the first image is designated, and
wherein selecting the at least one pixel comprises selecting a pixel corresponding to the designated position.

16. The method of claim 1, wherein generating the second image comprises:
generating the second image by using pixels selected in the first image based on the received input signal; and
correcting the second image by using the selected pixels included in the first image,
wherein the input signal is input by a user and includes at least one of a closed loop signal, a stroke signal, and a signal that designates a predetermined position on the first image.

17. The method of claim 16, wherein correcting the second image comprises repeatedly correcting the second image a number of times corresponding to a number of times that the input signal is received.

18. A non-transitory computer readable recording medium having embodied thereon a program for executing a processor to perform a method comprising the steps of:
obtaining a first image including the object;
receiving an input signal on the first image;
obtaining position information based on the received input signal;
selecting at least one pixel included in the first image, based on the position information;
generating a second image by dividing the first image into several areas, using the selected at least one pixel; and
segmenting the object in the first image by using the first image and the second image.

19. An apparatus for segmenting an object in an image, the apparatus comprising:
a processor operable to read and operate according to instructions within a computer program; and
a memory operable to store at least a portion of the computer program for access by the processor, wherein the computer program includes algorithms to cause the processor to:
obtain a first image including an object;
receive an input signal on the first image;
obtain position information based on the received input signal;
select at least one pixel included in the first image, based on the position information;
generating a second image by dividing the first image into several areas using the selected at least one pixel; and
segment the object in the first image by using the first image and the second image.

* * * * *